United States Patent
Gramoll et al.

(10) Patent No.: US 8,963,057 B2
(45) Date of Patent: Feb. 24, 2015

(54) ELECTRIC INDUCTION BRAZING IN AN INERT ATMOSPHERE

(75) Inventors: Brian R. Gramoll, Sussex, WI (US); Robert P. Frank, Greendale, WI (US)

(73) Assignee: Radyne Corporation, Milwaukee, WI (US)

( * ) Notice: Subject to any disclaimer, the term of this patent is extended or adjusted under 35 U.S.C. 154(b) by 1419 days.

(21) Appl. No.: 12/258,414

(22) Filed: Oct. 26, 2008

(65) Prior Publication Data

US 2009/0107989 A1    Apr. 30, 2009

Related U.S. Application Data (60) Provisional application No. 60/983,176, filed on Oct. 27, 2007.

(51) Int. Cl.
*B23K 13/01* (2006.01)
*B23K 31/02* (2006.01)

(52) U.S. Cl.
CPC ............. *B23K 13/01* (2013.01); *B23K 2203/12* (2013.01)
USPC .......... 219/615; 219/59.1; 219/600; 219/624; 219/642; 219/659; 228/230; 228/254; 228/118; 228/184; 228/212

(58) Field of Classification Search
CPC .......................... B23K 13/01; B23K 2203/12
USPC ........ 219/600–607, 59.1, 612–617, 624, 633, 219/629, 642–644, 651, 659–660, 672, 219/85.1, 85.12, 85.17, 129; 228/230, 254, 228/118, 131–132, 173.4, 178, 184, 212, 228/219, 262.31, 262.42, 262.51, 228/262.72–262.9
See application file for complete search history.

(56) References Cited

U.S. PATENT DOCUMENTS

| | | | | |
|---|---|---|---|---|
| 2,761,939 A * | 9/1956 | Finchelstein et al. | ......... | 219/614 |
| 3,633,266 A * | 1/1972 | Taylor | ........................ | 228/173.4 |
| 3,971,500 A * | 7/1976 | Kushner et al. | ................ | 228/154 |
| 4,873,823 A * | 10/1989 | Curths | ............................ | 60/293 |
| 5,076,198 A * | 12/1991 | Bottum | ......................... | 116/276 |
| 6,637,642 B1 * | 10/2003 | Lingnau | ..................... | 228/112.1 |
| 6,948,585 B2 * | 9/2005 | Lei et al. | ........................ | 181/233 |
| 2004/0118382 A1* | 6/2004 | Usui et al. | ..................... | 123/456 |
| 2005/0199615 A1 | 9/2005 | Barber et al. | | |

FOREIGN PATENT DOCUMENTS

JP    60197823 A  * 10/1985 ............... C21D 9/50
JP    3032185 U     10/1996

* cited by examiner

*Primary Examiner* — Dana Ross
*Assistant Examiner* — Ket D Dang
(74) *Attorney, Agent, or Firm* — Philip O. Post (57) ABSTRACT

Apparatus and method are provided for an electric induction brazing process in an inert atmosphere using a substantially oxygen-free copper alloy filler or preform under an inert atmosphere within a brazing chamber minimally sized for containment of the brazed joint region and an induction coil. The inert atmosphere may be nitrogen gas supplied from a liquid nitrogen source. For brazing of an open-interior fitting around a hole in a tubular material a nesting area is provided around the hole for seating of the filler or preform and the fitting.

15 Claims, 9 Drawing Sheets

PRIOR ART

PRIOR ART

ELECTRIC INDUCTION BRAZING IN AN INERT ATMOSPHERE

CROSS-REFERENCE TO RELATED APPLICATIONS

This application claims the benefit of U.S. Provisional Application No. 60/983,176, filed Oct. 27, 2007, hereby incorporated by reference in its entirety.

FIELD OF THE INVENTION

The present invention relates to electric induction brazing with a substantially oxygen-free copper alloy filler or preform under an inert gas atmosphere minimally contained around the braze joint region.

BACKGROUND OF THE INVENTION

Figure 1A:
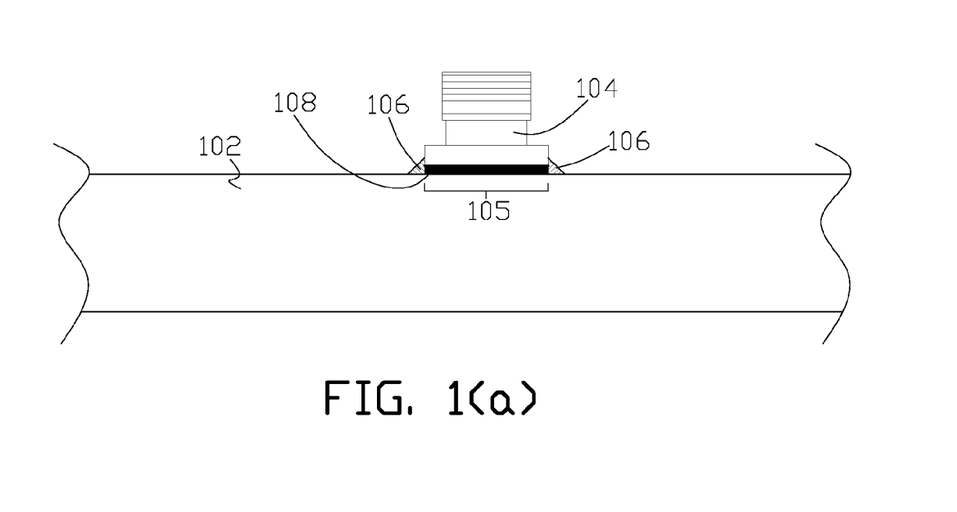
FIG. 1(a) is a detail elevational view illustrating a fitting tack welded to a tube to retain a copper alloy filler in place between the fitting and tube.
Figure 1B:
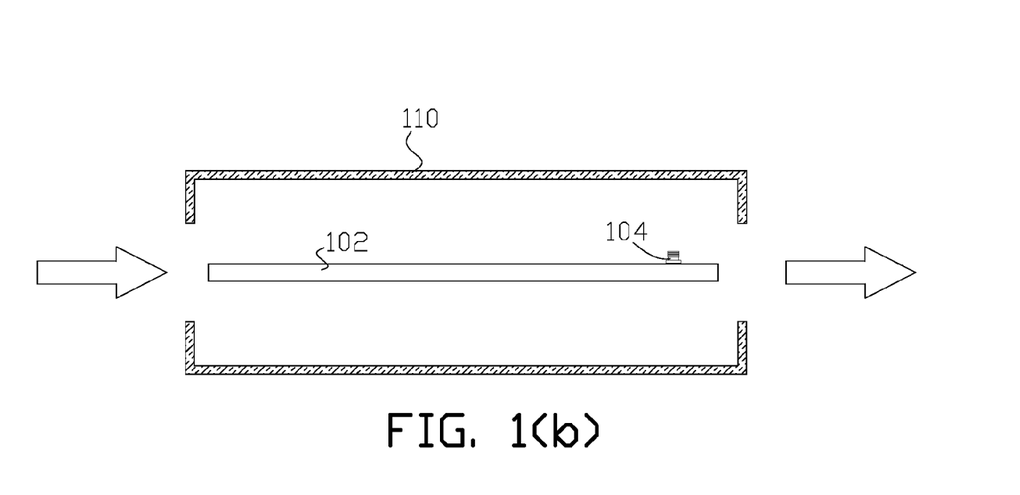
FIG. 1(b) illustrates the tube with fitting detail shown in FIG. 1(a) in a brazing furnace.
Figure 1C:
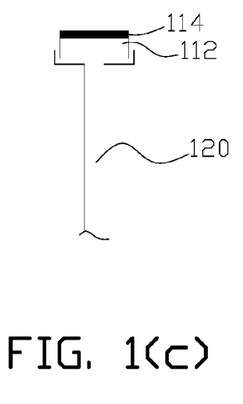
FIG. 1(c) is a detail elevational view illustrating an end cap fitting and a silver alloy filler seated on the end cap fitting.
Figure 1D:
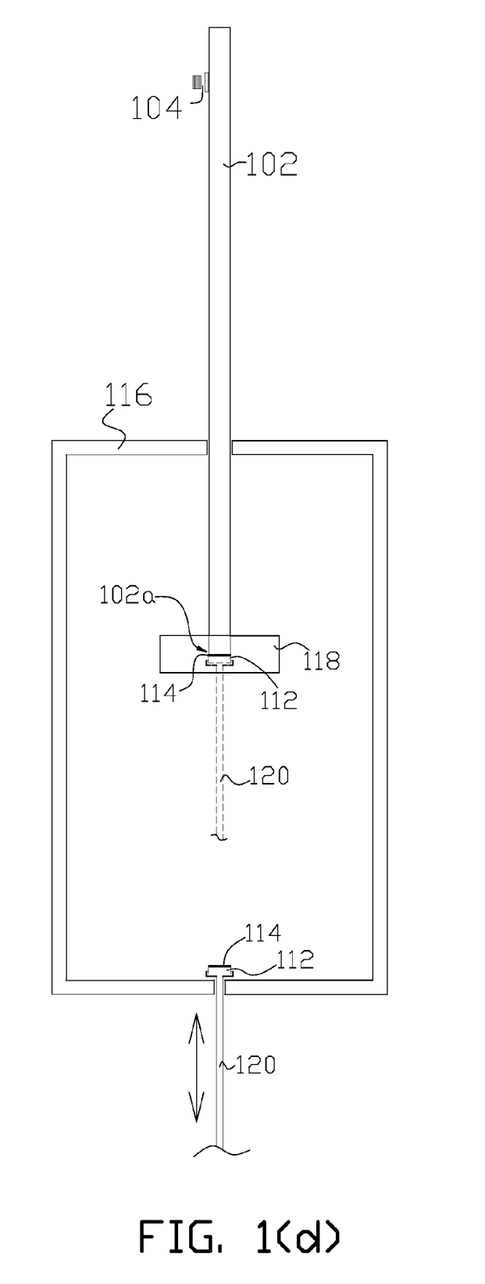
FIG. 1(d) illustrates the end cap fitting and silver alloy filler shown in FIG. 1(c) in a brazing box.
Figure 2A:
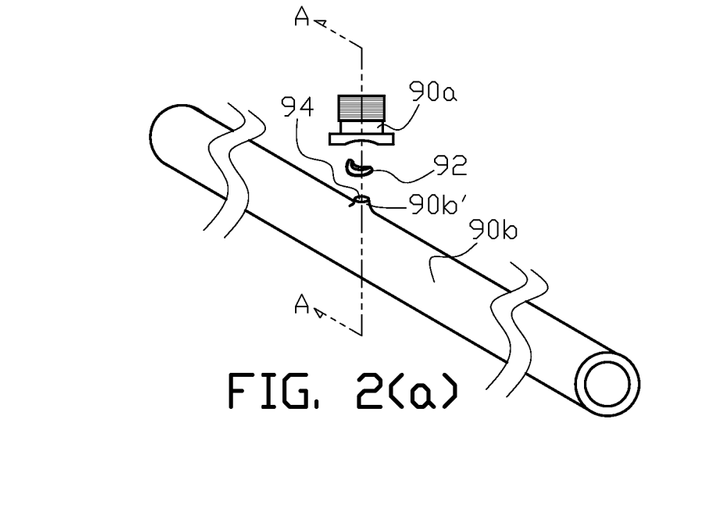
FIG. 2(a) is an exploded isometric view of one example of two articles to be joined by brazing with a substantially oxygen-free copper alloy filler or preform and FIG. 2(b) illustrates the filler or preform and one of the articles nested over a hole in the other article.
Figure 2B:
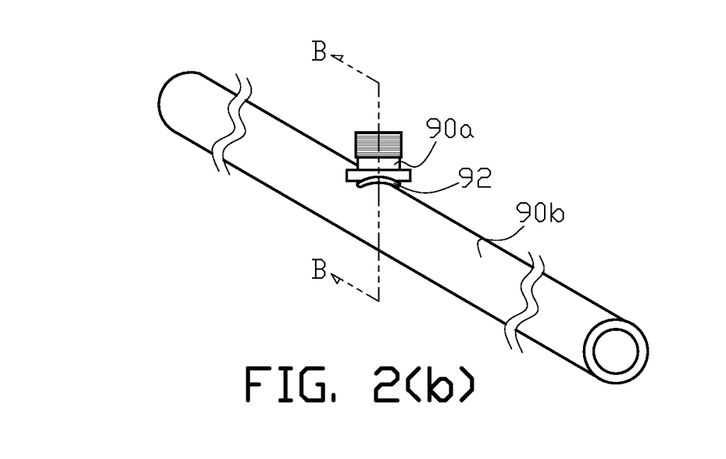

One method of copper brazing is in a furnace, for example, in a batch-type or continuous conveyor-type furnace. In both types of furnaces, heating is usually by hydrocarbon fueled burners or electrical resistance. The parts are fixtured and assembled with filler metals pre-placed near or in the joint. One example of copper brazing in a furnace is illustrated in FIG. 1(a) and FIG. 1(b). The articles to be joined by the brazing process may be stainless steel tube 102 and threaded fitting 104 with an open interior. Threaded fitting 104 is furnace brazed to the tube around hole 105 formed along the length of the tube. Prior to the furnace brazing process, one or more tack welds 106 are made between tube 102 and fitting 104 to hold a copper alloy filler 108 in place between the tube and fitting as illustrated in FIG. 1(a). Entire tube 102, with the tack welded threaded fitting 104, as shown in FIG. 1(a), is passed through furnace 110 having an internal temperature sufficient to melt the copper alloy filler for the brazing process that forms the brazed joint between the tube and fitting as illustrated in FIG. 1(b). Subsequent to exit from the furnace, an end fitting, such as end cap 112 (shown in detail in FIG. 1(c)) can be brazed to end 102a of tube 102, for example, by electric induction brazing using a silver alloy filler 114. As shown in FIG. 1(d), end 102a of tube 102 is top inserted into rectangular brazing box 116. End cap fitting 112 is seated on the end of linear driver 120 with silver alloy filler 114 seated on top of the end cap fitting. The end of linear driver 120 is initially positioned at the bottom of the brazing box as indicated in solid lines in FIG. 1(d). Linear driver 120 raises the end cap fitting, with the silver alloy filler sitting on top of the end cap fitting, to mate with end 102a of tube 102 as indicated in dashed lines in FIG. 1(d). Establishing a nitrogen atmosphere in the brazing box from a supply of nitrogen and supplying alternating current to ring induction coil 118 in the brazing box, induction brazes the end cap fitting 112 to end 102a of tube 102. One side of the brazing box can be formed from a hinged translucent panel so that an operator can observe the brazing process, and to facilitate placement of the end cap fitting and silver alloy filler on the end of linear driver 120.

Disadvantages of furnace copper brazing include: potential for distortion due to heating of the entire part; annealing in undesirable regions of the part: high rate of gas consumption; high operating cost; batching of parts in a batch-type furnace without one piece flow; and complicated fixturing.

Another method of copper brazing is by torch, for example, with a handheld oxyfuel gas torch using various fuels. Disadvantages of manual torch copper brazing include: manual fixturing; addition of too little or too much braze alloy; insufficient addition of flux; and quality inconsistencies between successive parts.

Included in the objectives of the present invention is to provide a copper brazing process by electric induction that: results in high tensile strength brazed joints; uses a low cost and corrosion resistance copper alloy filler; is fluxless; results in clean parts; localizes application of heat, which results in less distortion of the part; is adaptable to cellular environment manufacturing; is a one piece flow process with no product batching required; and uses a low amount of cover gas.

SUMMARY OF THE INVENTION

In one aspect the present invention is apparatus for, and method of, electric induction brazing a first article to a second article with a substantially oxygen-free copper alloy filler or preform in an inert gas atmosphere contained within a joint brazing chamber having an interior volume minimally sized for the braze joint region and induction coil. The inert gas may be nitrogen supplied from a liquid nitrogen source.

In another aspect the present invention is apparatus for, and method of, electric induction brazing a first article to a second article over a hole in the second article in an inert gas atmosphere. The hole in the second article is formed in a way to create a nesting region in the second article around the hole for seating of a substantially oxygen free copper filler or preform and the first article. The electric induction brazing is accomplished in a joint brazing chamber having at least one induction coil for heating and melting the filler to form a brazed joint between the first and second articles in the inert gas atmosphere. The first article may be a stainless steel fitting and the second article may be a stainless steel tube. The inert gas may be nitrogen supplied from a liquid nitrogen source.

The above and other aspects of the invention are further set forth in this specification and the appended claims.

BRIEF DESCRIPTION OF THE DRAWINGS

For the purpose of illustrating the invention, there is shown in the drawings a form which is presently preferred. It being understood, however, that this invention is not limited to the precise arrangements and instrumentalities shown.

DETAILED DESCRIPTION OF THE INVENTION

In one non-limiting example of the electric induction brazing process of the present invention, the articles to be joined are stainless steel pressure fitting 90a and 304L series alloy stainless steel tube 90b as illustrated, for example, in FIG. 2(a), FIG. 2(b), FIG. 3(a) and FIG. 3(b). Fitting 90a comprises a threaded fitting with an open interior. Filler 92 is an oxygen-free copper (OFC) alloy filler shim or preform in the shape of a saddle that is seated over hole 94 in tube 90b. The shim may be preformed from stampings of a thin sheet of copper. Preferably, but not by way of limitation, hole 94 is drilled in tube 90b by a process that forms a generally conical or cylindrical nesting or seating region 90b' exterior to the tube. One suitable method of drilling is thermal (flow) drilling wherein the drilling tool causes thermal deformation of the tubular material to form the nesting region during the drilling of the hole. FORMDRILL (available from UNIMEX FORMDRILL, Beringen, BELGIUM) is one type of drilling tool that can be used. Filler 92 and fitting 90a can be nested or seated over region 90b' as illustrated in FIG. 2(a), FIG. 2(b), FIG. 3(a) and FIG. 3(b) without requiring other means of keeping the filler and fitting in place around the hole.

Figure 3A:
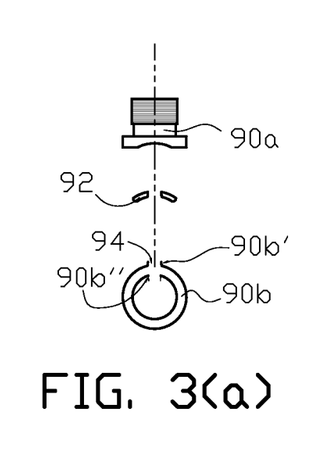
FIG. 3(a) and FIG. 3(b) are corresponding cross sectional views through lines A-A and B-B in FIG. 2(a) and FIG. 2(b) respectively.
Figure 3B:
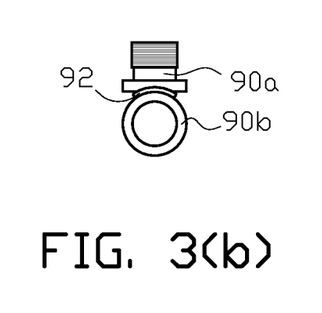

The thermal drilling process may also create an annular structure 90b" around the hole in the interior of the tube as shown in FIG. 3(a) that obstructs the smooth interior wall of the tube. In applications where this interior protrusion is undesirable, for example, where the protrusion interferes with a desired laminar flow along the interior walls of the tube, an alternative drilling process may be used, for example, where the tubular material around the hole is drawn out of the tube as part of the drilling process to form the nesting or seating region. T-DRILL (available from T-DRILL Industries Inc., Norcross, Ga., UNITED STATES) is one type of drilling tool that can be used for this approach.

One non-limiting example of an induction brazing apparatus of the present invention is illustrated in FIG. 4, FIG. 5(a), FIG. 5(b) and FIG. 6. While the brazing apparatus in these figures includes two joint brazing chambers so that two brazing processes can be performed simultaneously, other examples of the invention may include any number of joint brazing chambers, including a single joint brazing chamber as further described below.

Figure 4:
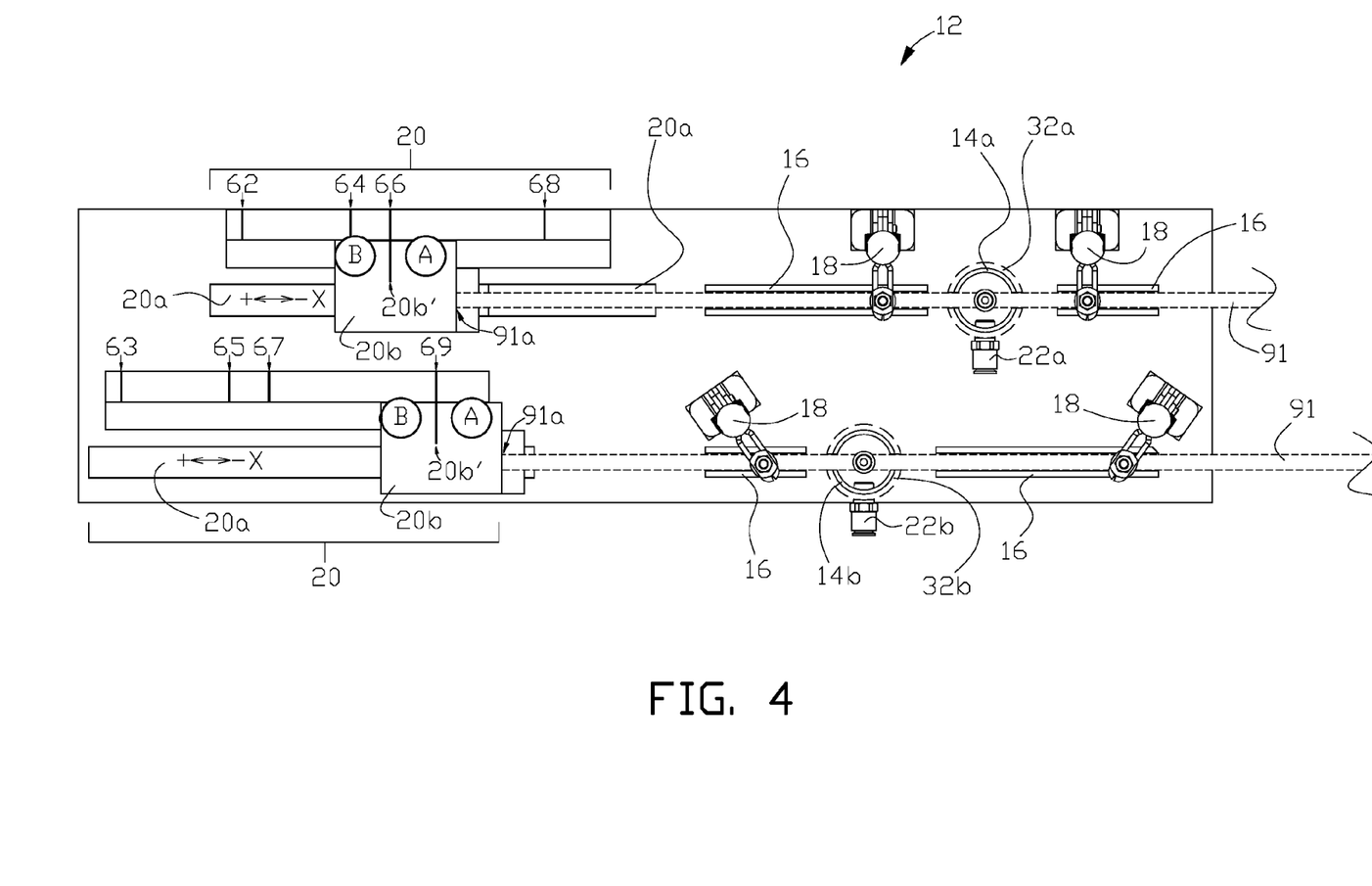
FIG. 4 is a top plan view of a base assembly and associated base-mounted components of one example of the electric induction brazing apparatus of the present invention.

Referring to FIG. 4, mounted on the base assembly 12 are lower joint brazing enclosures 14a and 14b. In this non-limiting example, the lower brazing enclosures have a smaller inside diameter than the inside diameters of their corresponding upper brazing enclosures, which are attached to upper assembly 30 as further described below, so that each lower brazing enclosure will fit into its corresponding upper brazing enclosure. For reference in FIG. 4, upper brazing enclosures 32a and 32b are shown in dashed lines. In other examples of the invention the relative sizing of the inside diameters of the upper and lower brazing enclosures may be reversed, or other configurations may be used to form an openable closed joint brazing chamber. The lower brazing enclosures may be formed from any non-metallic and heat resistant material, such as but not limited to, a TEFLON composition. Guide rails 16 are provided for seating and positioning an article, such as tubular material 91 (shown in dashed lines in FIG. 4), for the brazing process, as further described below. Adjustable clamping devices 18 can be provided to lock the article in position on the rails. Arrangement of the rails, or other positioning devices for the article, and the locking devices will vary depending upon the articles joined by the brazing process.

Optional process control assembly 20 may be provided for use with each joint brazing chamber. Assembly 20 may comprise slide rail 20a upon which nesting plate 20b is slidably attached so that it may be selectively locked into a position along the slide rail based upon the length of a particular article 91 on guide rails 16 and the location of the braze joint region along the length of the article. End 91a of article 91 is butted up against a side of a slideable nesting plate as shown in FIG. 4. One or more sensors may be placed on the side of nesting plate 20b, for example, to indicate proper positioning of the article on the rails and/or to initiate the induction brazing process as further described below. Nesting plate 20b can be moved along rail 20a in the plus or minus X direction until marker line 20b' on a slideable nesting plate aligns with one of the fixed marker lines 62/63, 64/65, 66/67 or 68/69, each of which marker lines reflects a particular type of article and the location of the braze joint region along the length of the article. Locking knob A and B may be used to lock the nesting plate into a particular position.

Figure 5A:
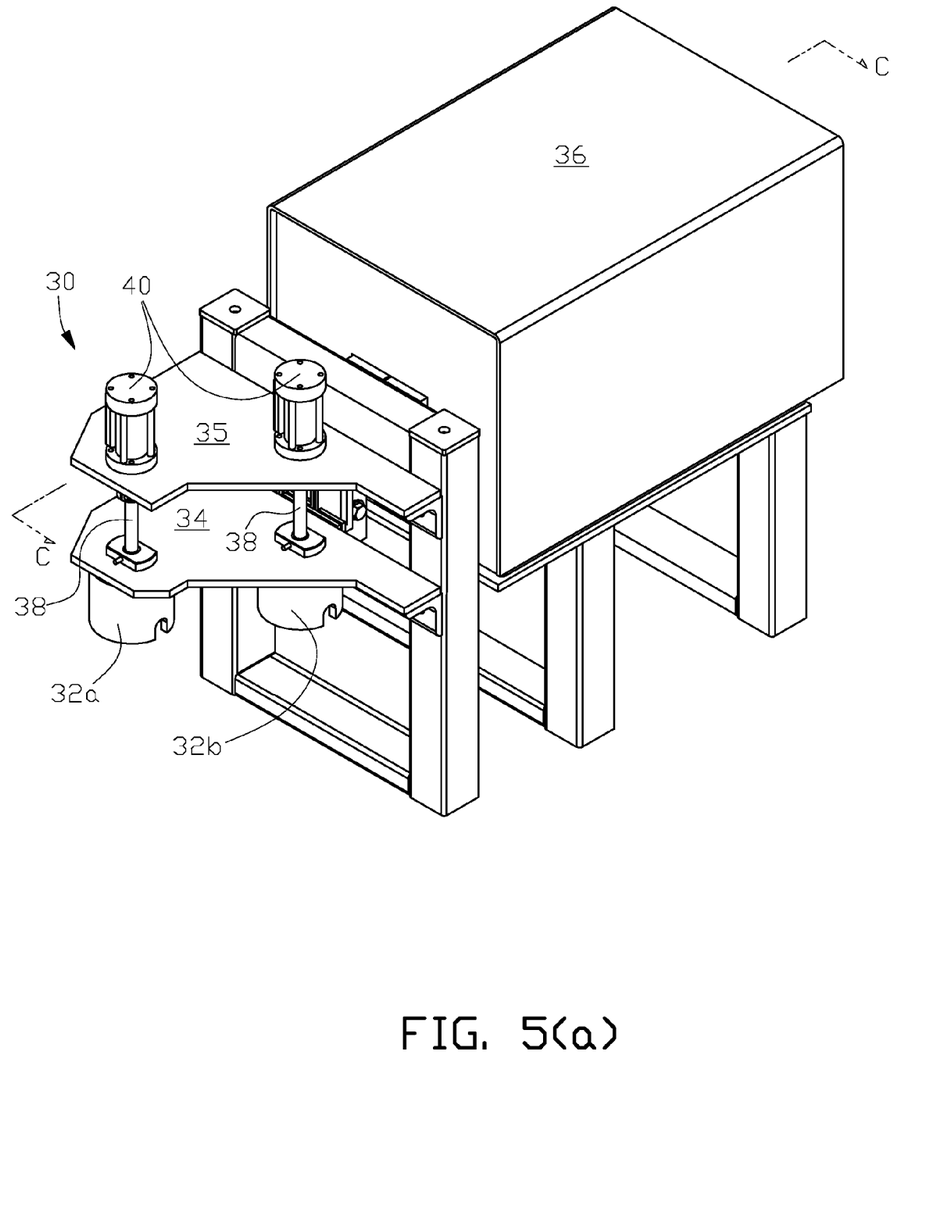
FIG. 5(a) is an isometric view of the upper assembly and associated upper assembly-mounted components of one example of the electric induction brazing apparatus of the present invention.
Figure 5B:
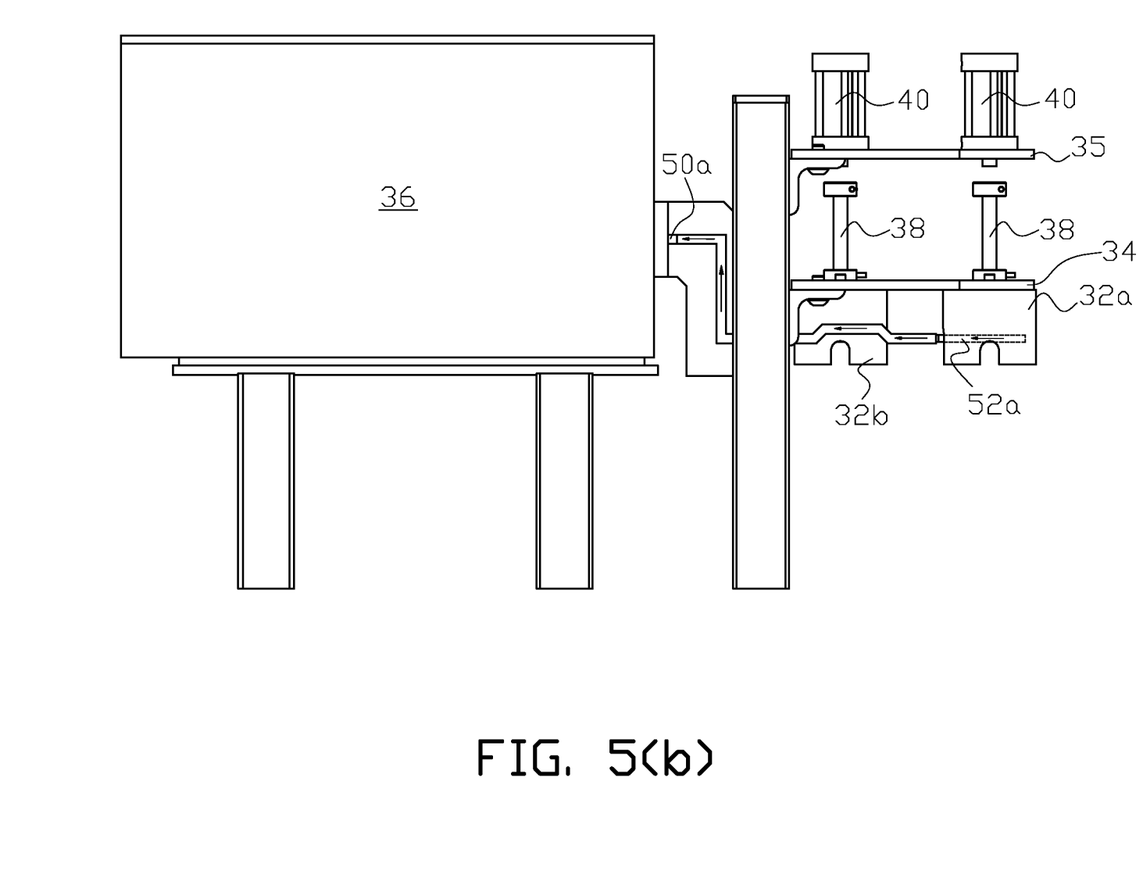
FIG. 5(b) is a cross sectional view through line C-C of the upper assembly and associated upper assembly-mounted components shown in FIG. 5(a).

Referring to FIG. 5(a) and FIG. 5(b), upper assembly 30 includes upper joint brazing enclosures 32a and 32b mounted on structural element 34. The upper brazing enclosures may be formed from any non-metallic and heat resistant material, such as but not limited to, a TEFLON composition.

Figure 6:
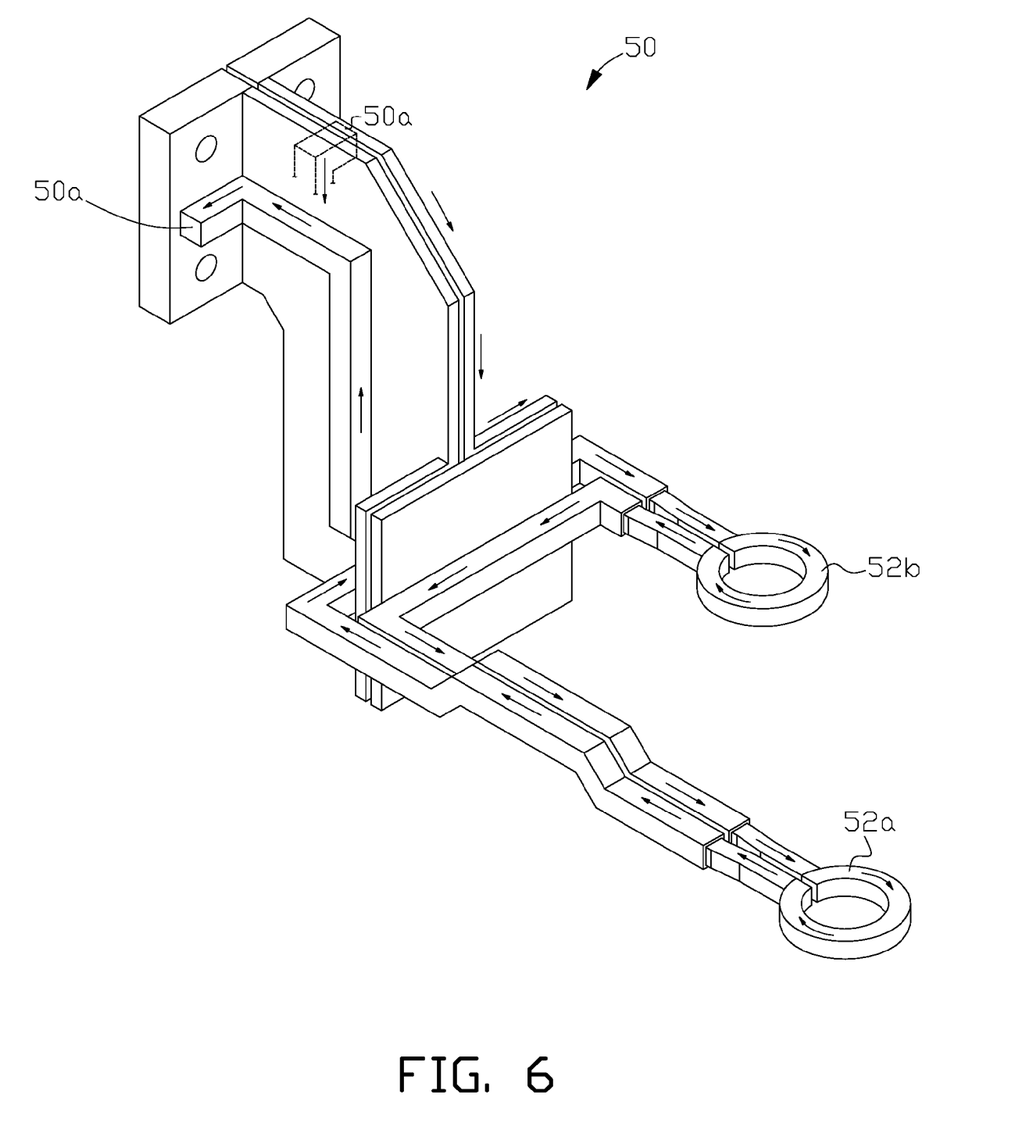
FIG. 6 is an isometric view of one example of an electric induction coil assembly that can be used with the apparatus illustrated in FIG. 4, FIG. 5(a) and FIG. 5(b).

Induction coil assembly 50, as illustrated in FIG. 6, is attached to electric impedance matching and/or transformer apparatus 36 by coil terminating electrical connections 50a. Inductor loops 52a and 52b of induction coil assembly 50 are positioned in upper joint brazing enclosures 32a and 32b respectively, for the dual processing apparatus shown in FIG. 4, 5(a) and FIG. 5(b), as illustrated, for example, in FIG. 5(b) for inductor loop 52a (shown in dashed lines) within upper joint brazing enclosure 32a. The induction coil assembly in this non-limiting example of the invention comprises a water cooled, square hollow copper tube inductor supported by suitable non-electrically conductive materials. The coil may be of other shapes in other examples of the invention, and may be cooled by other methods such as air cooling. The direction of instantaneous alternating current (ac) flow through the inductor is illustrated by the arrows in FIG. 6.

In other example of the invention an inductor loop may be at least partially embedded in an upper brazing enclosure. Suitable openings are provided in the upper joint brazing enclosures for installation of the inductor loops in the enclosures. A suitable induction coil is available as coil 10S715070 from RADYNE CORP. (Milwaukee, Wis.). The impedance matching and/or transformer apparatus 36 are connected to a suitable ac power source, such as FLEXITUNE 30 available from RADYNE CORP. (Milwaukee, Wis.) so that ac current is provided to inductor loops 52a and 52b during the induction brazing process as further described below. A typical suitable power supply output rating is 30 kilowatts with a frequency ranging from 20 kHz to 40 kHz. Actual operating power output level is determined by required production rates for a particular application. In other examples of the invention, the induction coil assembly may be electrically connected directly to the output of the power supply. In other examples of the invention, the impedance matching and/or transformer apparatus may be located separate from upper assembly 30.

Upper assembly 30 may also include article centering and holding apparatus, which in this non-limiting example of the invention comprises shafts 38, each one of which penetrates into one of the upper joint brazing enclosures to serve as a centering and retaining device for the articles and filler during the brazing process as further described below, and mechanical actuators 40, such as pneumatic or hydraulic cylinders, each one of which is positioned over one of the shafts 38 and mounted on structural element 35.

Figure 7:
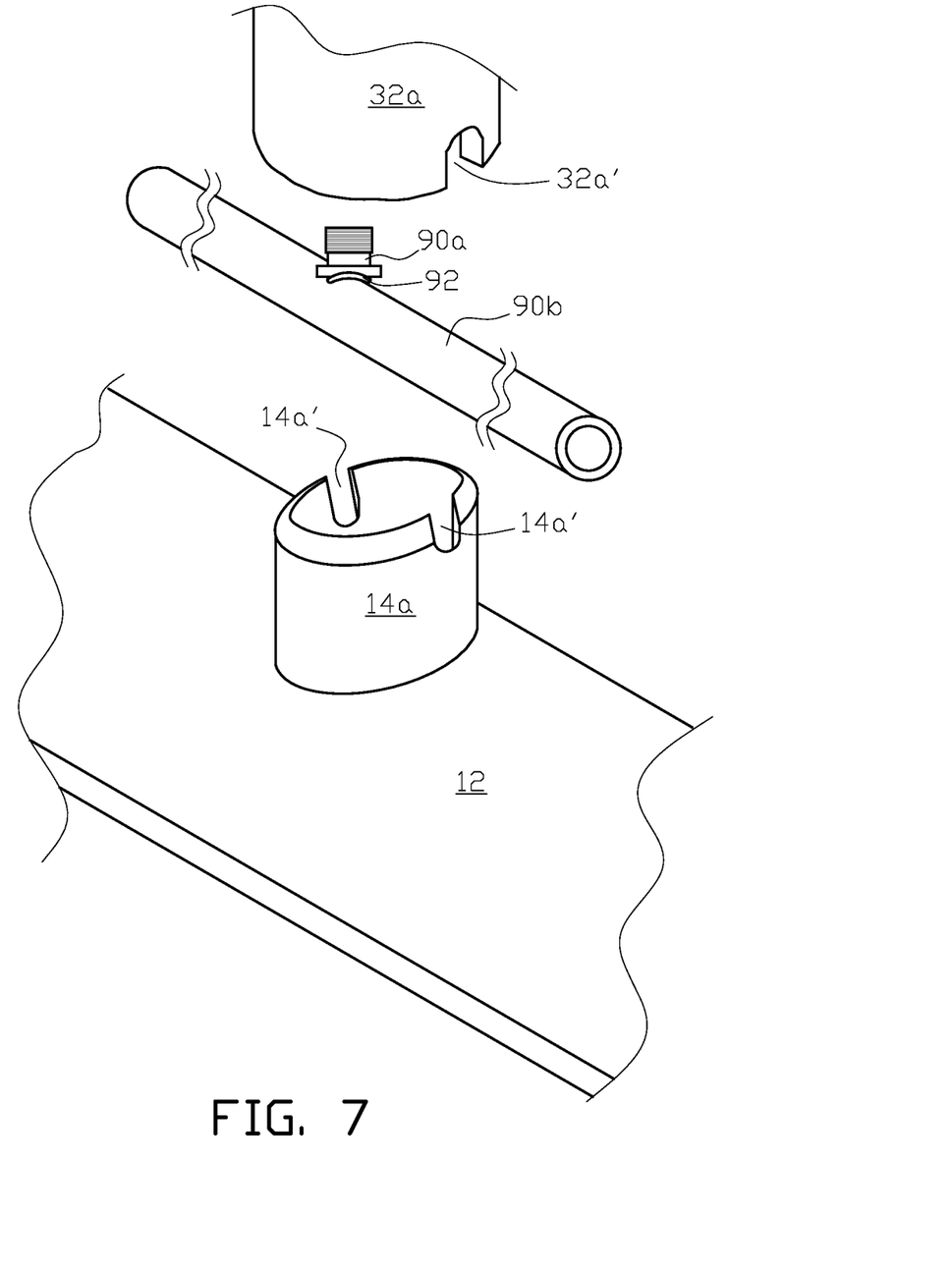
FIG. 7 is a simplified diagram of upper and lower brazing enclosures used to form a joint brazing chamber in one example of the present invention with the enclosures shown in the opened position, and with the two articles and filler shown in FIG. 2(b) for reference.

The apparatus of the present invention, as illustrated in FIG. 4, FIG. 5(a) and FIG. 5(b) may be used to induction braze the articles shown in FIG. 2(a), FIG. 2(b), FIG. 3(a) and FIG. 3(b) and previously described above. The process will be described with reference to only one of the two joint brazing chambers shown in the figures, namely the joint brazing chamber comprising upper brazing enclosure 32a and corresponding lower brazing enclosure 14a. The setup process, after hole 94 has been drilled in tube 90b as described above, comprises first cleaning, if necessary, fitting 90a, tube 90b and filler 92 to remove any contaminates. Tube 90b is properly located on rails 16 and locked into position with clamping devices 18 so that hole 94 faces up in lower brazing enclosure 14a. Filler 92, which is a saddle-shaped shim, is positioned over the hole around nesting region 90b'. Fitting 90a is placed over the filler around the nesting region. If required for a particular application, the article centering and holding apparatus can be used to ensure that fitting 90a is properly seated on top of filler 92 and to apply pressure to fitting 90a during the induction heating step described below so that proper mating between fitting 90a and tube 90b occurs as the filler 94 becomes liquidus. This can be accomplished by stroking mechanical actuator 40 to push down on the top end of shaft 38, which in turn, forces shaft 38 downward through upper brazing enclosure 32a so that the opposing bottom end of shaft 38 makes contact with fitting 90a sitting on top of tube 90b and filler 92 in the lower brazing enclosure. The bottom end of shaft 38 can be shaped so that it seats into the opening in fitting 90a and applies downward pressure on the fitting towards the filler and the top of tube 90b. The setup may be performed manually or automatically with suitable apparatus. Further in other examples of the invention placement of filler 92 and fitting 90a on nesting region 90b' around hole 94 may be accomplished prior to locating tube 90b on the rails. FIG. 7 is a simplified drawing of lower brazing enclosure 14a mounted on base assembly 12, with filler 92 and fitting 90a sitting over the hole in tube 90b prior to seating of the tube on the rails (not shown in FIG. 6) and into the notches or openings 14a' of the lower brazing enclosure.

Figure 8:
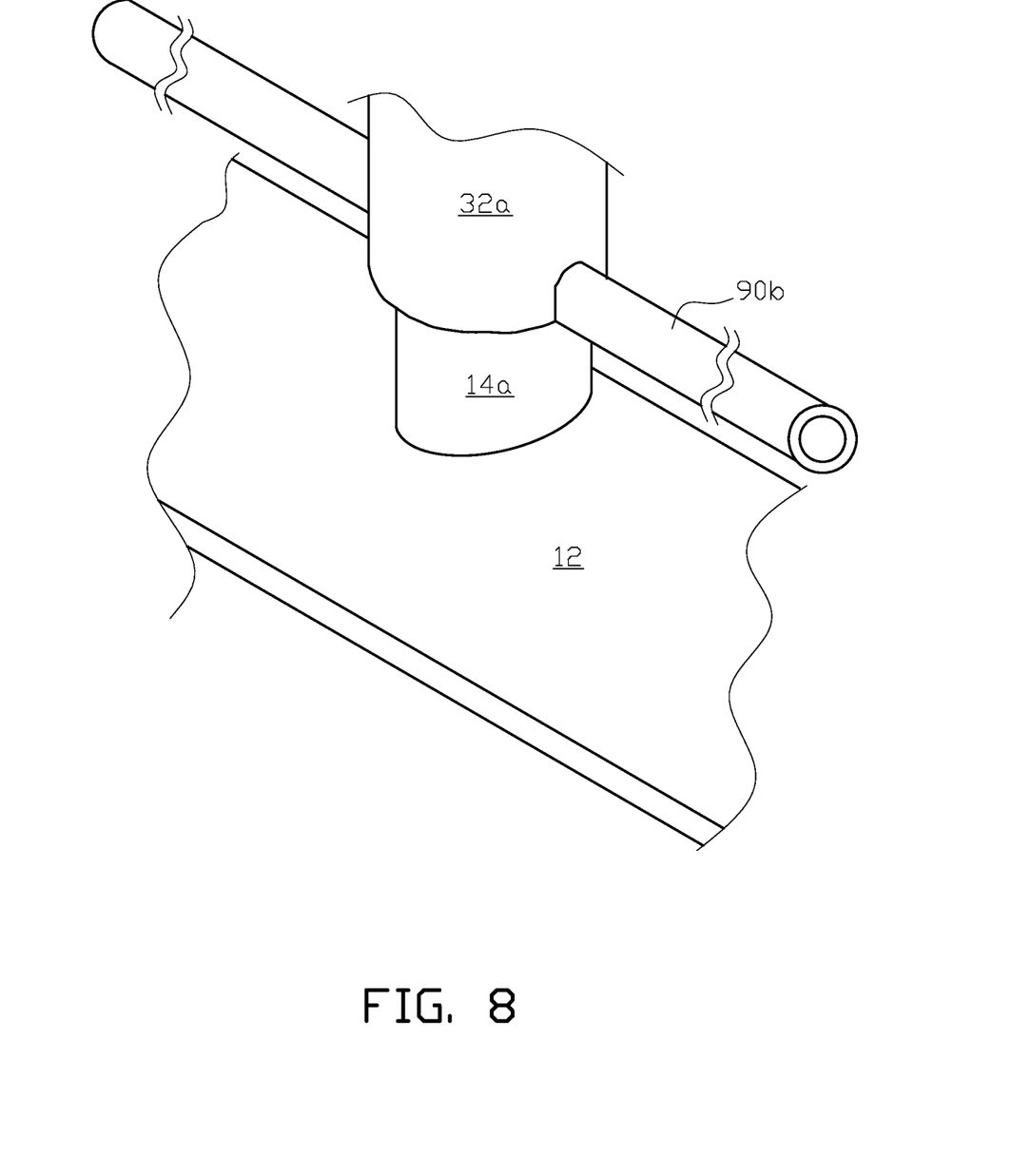
FIG. 8 is a simplified diagram of upper and lower brazing enclosures used to form a joint brazing chamber in one example of the present invention with the enclosures shown in the closed position to form the joint brazing chamber, with one of the two articles and filler shown in FIG. 2(b) enclosed in the joint brazing chamber.

After locking tube 90b in rails 16 with the filler and fitting sitting on top of the hole in the tube in the lower brazing enclosure, the base assembly 12 can be raised by any suitable means, such as a linear pneumatic or hydraulic drive system (brazing enclosure position driver), so that lower joint brazing enclosure 14a rises to fit into upper brazing enclosure 32a until tube 90b seats into notches or openings 32a' in the upper brazing enclosure as illustrated in the simplified drawing FIG. 8. The interior volume of the joined upper and lower brazing enclosures forms the atmosphere containment joint brazing chamber for the induction brazing process with inductor loop 52a positioned inside the upper brazing enclosure and around the fitting and filler to provide uniform heating around the tube and fitting. In other examples of the invention the upper brazing enclosure may be lowered by suitable apparatus to mate with a stationary lower brazing enclosure, or the upper and lower brazing enclosures may both coordinately move towards each other to mate and form the atmosphere containment joint brazing chamber. Ideally the interior volume of the openable joint brazing chamber is minimally sized for containment of the joint brazing region formed by the copper alloy filler and adjacent surfaces of the tube and fitting, and the inductor loop. In alternative examples of the invention, the inductor loop, or induction coil, may be formed within the upper brazing enclosure to further reduce the interior volume of the joint brazing chamber.

Once the closed atmosphere containment joint brazing chamber has been formed with the lower brazing enclosure fitting snugly into the upper brazing enclosure, an air pre-purge step can be performed by injecting pure (preferably at least 99.9 percent) nitrogen gas into the joint brazing chamber, for example, by connecting port 22a (port 22b for lower brazing enclosure 14b) in lower brazing enclosure 14a (FIG. 4) to a suitable source of nitrogen. Alternatively the gas port may be provided in the upper brazing enclosure or other structure making up the joint brazing chamber. Preferably but not by way of limitation, the source nitrogen is in the liquid state to ensure the desired purity of the nitrogen. The joint brazing chamber is not totally sealed when closed. Consequently air (substantially all oxygen content) is purged from the chamber during the pre-purge step, which, by way of example and not limitation, may take approximately 3 seconds. After the pre-purge step, suitable ac power is applied to the inductor so that ac current flow through inductor loop 52a inductively heats and melts the filler material, which in this example is an OFC alloy that requires a brazing temperature of approximately of 2040° F. Typically, for this non-limiting example, electric power characteristics are 6 kilowatts per induction brazing process and the induction heating process may take approximately 14 seconds. The flow of nitrogen gas continues during the induction heating step to keep the atmosphere in the joint brazing chamber substantially oxygen free, although the gas flow rate may be lower than that for the pre-purge flow rate. Upon completion of the induction heating step, a post-purge (cool down) step occurs during which the nitrogen gas flow rate into the joint brazing chamber can be increased to quicken the cool down of the brazed articles. A typical, but non-limiting, cool down cycle may take about 30 seconds. Gas flow rates may be regulated during each of the induction brazing steps by any suitable method, for example, separate flow rate regulating solenoid valves. Preferably the surface temperature of the brazed articles should be below 400° F. before the containment atmosphere joint brazing chamber is opened, for example, by lowering base assembly 12 with lower brazing enclosure 14a attached to the base assembly. If the chamber is opened prior to that temperature, discoloration of the brazed article will occur; waiting until the surface temperature of the article, or finished brazed product, is below 400° F. ensures that the brazed product will have the same surface composition and coloration as the articles used in the brazing process had prior to the start of the induction brazing process. Quick cool down also prevents heat conduction from the braze joint region along the length of the tube.

The apparatus and method of the present invention can be used in a 100 percent repeatable induction brazing process if the disclosed conditions are satisfied. In some particular installations, one or more test runs may be conducted, for example, to set optimal: gas flow rates, pre-purge, induction heating, and cool down process times; and induction power settings to achieve 100 percent repeatability.

While the above examples of the invention describe induction brazing of a stainless steel fitting to a stainless steel tube, the apparatus and process of the present invention may be used to join together other articles in the disclosed brazing process. While the above examples of the invention utilize nitrogen gas as the inert gas atmosphere during the induction brazing process, other inert gases, or combinations of inert gasses, may be used in other examples of the invention.

Terms of orientation, such as upper and lower, are used for convenience only and do not limit the apparatus and method of the present invention in terms of orientation of elements of the invention.

The present invention may be embodied in other specific forms without departing from the essential attributes thereof and, accordingly, reference should be made to the appended claims in addition to the foregoing specification, as indicating the scope of the invention. The above examples of the invention have been provided for the purpose of explanation, and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. A method of joining at least two articles together by electric induction brazing, the method comprising the steps of:
   placing an oxygen free copper alloy filler or preform in a braze joint region between the at least two articles;
   forming a closed chamber around the braze joint region, the closed chamber having an interior volume sized to enclose the braze joint region and an induction coil connected to a source of alternating current;
   flowing an inert gas into the closed chamber to establish an inert atmosphere in the closed chamber; and
   supplying the source of alternating current to the induction coil to inductively heat and melt the oxygen free copper alloy filler or preform in the inert atmosphere to form a brazed joint.

2. The method of claim 1 wherein the step of flowing the inert gas into the closed chamber further comprises the step of post-purging the closed chamber with the inert gas at an increased flow rate after heating and melting of the oxygen free copper alloy filler or preform to rapidly cool the braze joint region prior to opening the closed chamber.

3. The method of claim 1 wherein the at least two articles comprise an open-interior fitting and a tubular article.

4. The method of claim 3 further comprising the step of drilling a hole in the tubular article to form a raised nesting area around the hole for seating of the oxygen free copper alloy filler or preform and the open-interior fitting to form the braze joint region.

5. An electric induction brazing apparatus for joining an open-interior fitting over a hole in an article, the apparatus comprising:
   a base assembly;
   a lower brazing enclosure disposed on the base assembly;
   an upper assembly;
   an upper brazing enclosure disposed on the upper assembly;
   at least one induction coil disposed within the upper brazing enclosure;
   a power source located exterior to the upper brazing enclosure, the power source supplying an alternating current to the at least one induction coil;
   an assembly positioning driver to move either the base assembly or upper assembly so that the upper and lower brazing enclosures form a closed joint brazing chamber around a joint braze region formed around the open-interior fitting and the hole in the article with an oxygen-free copper alloy filler or preform disposed between the open-interior fitting and the perimeter of the hole; and
   a port in either the upper or lower brazing enclosure for injecting an inert gas into the closed joint brazing chamber.

6. The electric induction brazing apparatus of claim 5 further comprising an article seating or positioning rail disposed on the base assembly to position the hole within the lower brazing enclosure.

7. The electric induction brazing apparatus of claim 5 further comprising a centering or holding device for centering or holding the open-interior fitting over the oxygen-free copper alloy filler or preform and around the hole in the article.

8. The electric induction brazing apparatus of claim 7 wherein the centering or holding device comprises a driven shaft having an end penetrating through the top of the upper brazing enclosure, the end selectively making contact with the open-interior fitting over the oxygen-free copper alloy filler or preform and around the perimeter of the hole in the second fitting.

9. The electric induction brazing apparatus of claim 5 further comprising a drilling tool for forming a raised nesting region around the hole during formation of the hole for seating of the oxygen-free copper alloy filler or preform and the open-interior fitting.

10. The electric induction brazing apparatus of claim 9 wherein the drilling tool comprises a thermal flow drill.

11. The electric induction brazing apparatus of claim 5 wherein the at least one induction coil is at least partially embedded in the upper brazing enclosure.

12. A method of joining an open-interior fitting around a hole in an article, the method comprising the steps of:
   drilling the hole in the article to form a seating region around the outer perimeter of the hole;
   placing an oxygen-free copper alloy filler or preform around the seating region;
   positioning the open-interior fitting over the oxygen-free copper alloy filler or preform to form a braze joint region between the open-interior fitting and the article;
   forming a closed chamber around the braze joint region, the interior volume of the closed chamber sized to enclose the braze joint region and an induction coil;
   flowing an inert gas into the closed chamber to establish an inert atmosphere in the chamber; and
   supplying alternating current to the induction coil to inductively heat and melt the oxygen-free copper alloy filler or preform in the inert atmosphere to form a brazed joint.

13. The method of claim 12 wherein the step of drilling the hole further comprises creating a thermal flow of the material comprising the article to create the seating region.

14. The method of claim 12 wherein the article comprises a stainless steel tubular article and the open-interior fitting comprises a stainless steel threaded fitting.

15. The method of claim 12 wherein the step of flowing the inert gas into the closed chamber further comprises the step of post-purging the closed chamber with the inert gas at an increased flow rate after heating and melting the oxygen-free copper alloy filler or preform to rapidly cool the braze joint region prior to opening the closed chamber.

* * * * *